(12) United States Patent
Shinno

(10) Patent No.: US 11,343,388 B2
(45) Date of Patent: May 24, 2022

(54) IMAGE FORMING DEVICE

(71) Applicant: KONICA MINOLTA, INC., Tokyo (JP)

(72) Inventor: Tatsuya Shinno, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/198,486

(22) Filed: Mar. 11, 2021

(65) Prior Publication Data
US 2021/0329133 A1  Oct. 21, 2021

(30) Foreign Application Priority Data

Apr. 17, 2020 (JP) .............................. JP2020-073758

(51) Int. Cl.
*H04N 1/00* (2006.01)
*G06F 3/12* (2006.01)

(52) U.S. Cl.
CPC ....... *H04N 1/00267* (2013.01); *G06F 3/1256* (2013.01); *H04N 1/0044* (2013.01); *H04N 1/00482* (2013.01)

(58) Field of Classification Search
CPC ............. H04N 1/00267; H04N 1/0044; H04N 1/00482; G06F 3/1256; G06F 3/1222; G06F 3/1238; G03B 21/134
See application file for complete search history.

(56) References Cited

U.S. PATENT DOCUMENTS

2009/0086173 A1* 4/2009 Combs ................ G03B 21/134
353/122

FOREIGN PATENT DOCUMENTS

| JP | 2013066026 A | 4/2013 |
| JP | 2014007625 A | 1/2014 |
| JP | 2018054642 A | 4/2018 |
| JP | 2018087777 A | 6/2018 |

\* cited by examiner

*Primary Examiner* — King Y Poon
*Assistant Examiner* — Michael Burleson
(74) *Attorney, Agent, or Firm* — Buchanan Ingersoll & Rooney PC

(57) ABSTRACT

An image forming device that executes a preview display of an image to be printed, including: a projector; a panel display; a receiver that receives an instruction indicating whether or not to implement security in the preview display; and a controller that, when an instruction to implement security is not received, controls the projector to execute the preview display according to a first mode that represents the image to be printed at a display area equal to or larger than a defined size, and when an instruction to implement security is received, controls the projector and the panel display to execute the preview display according to a second mode that represents the image to be printed at a display area less than the defined size.

13 Claims, 12 Drawing Sheets ical Field

The present disclosure relates to image forming devices that execute a preview display of an image to be printed.

Description of the Related Art

A preview display is a function that converts image data to be printed into a print format according to a print setting and displays the print formatted image data so that a user can confirm in advance whether or not a mistake has been made in the print setting. However, a display area of a display panel of an image forming device is typically small, and even if a preview display is executed, a mistake in a print setting might not be noticed until after an image is actually printed. In order to prevent print settings being overlooked when screen size is small, image forming devices exist that execute a preview display representing a print target with a display area larger than that of a display panel (hereinafter also referred to as a "real preview").

JP 2013-066026 describes an image forming device that uses a document holding surface of a document holder as a projection screen, and projects an image read by a document reader onto the projection screen, thereby displaying the image in actual size.

JP 2018-54642 describes an image forming device that executes a preview display at a specified paper size by using a projector.

When a printer described in JP 2013-066026 or JP 2018-54642 executes a preview display by enlarging a print target to a paper size and projecting the image onto a projection screen, a large copy of an image to be printed is displayed on a document holder or wall surface, and is visible to a third party at a distance. A user for whom print image security is important may refrain from using a preview display that enlarges a print target to a paper size for fear that the print image may be seen by a third party. If many users refrain from using the real preview, the addition of a projector becomes pointless, and even if a projector is mounted on an image forming device, the maker of the image forming device becomes unable to use this addition as a selling point to enhance the appeal of its product.

SUMMARY

An object of the present disclosure is to provide an image forming device that maintains security of printed content while ensuring that a real preview can be executed.

To achieve at least the above object, an image forming device reflecting one aspect of the present invention executes a preview display of an image to be printed, the image forming device including: a projector; a panel display; a receiver that receives an instruction indicating whether or not to implement security in the preview display; and a controller that, when an instruction to implement security is not received, controls the projector to execute the preview display according to a first mode that represents the image to be printed at a display area equal to or larger than a defined size, and when an instruction to implement security is received, controls the projector and the panel display to execute the preview display according to a second mode that represents the image to be printed at a display area less than the defined size.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the invention. In the drawings.

DETAILED DESCRIPTION

Hereinafter, embodiments of an image forming device according to the present disclosure are described with reference to the drawings.

[1] Exterior of Image Forming Device

Figure 1:
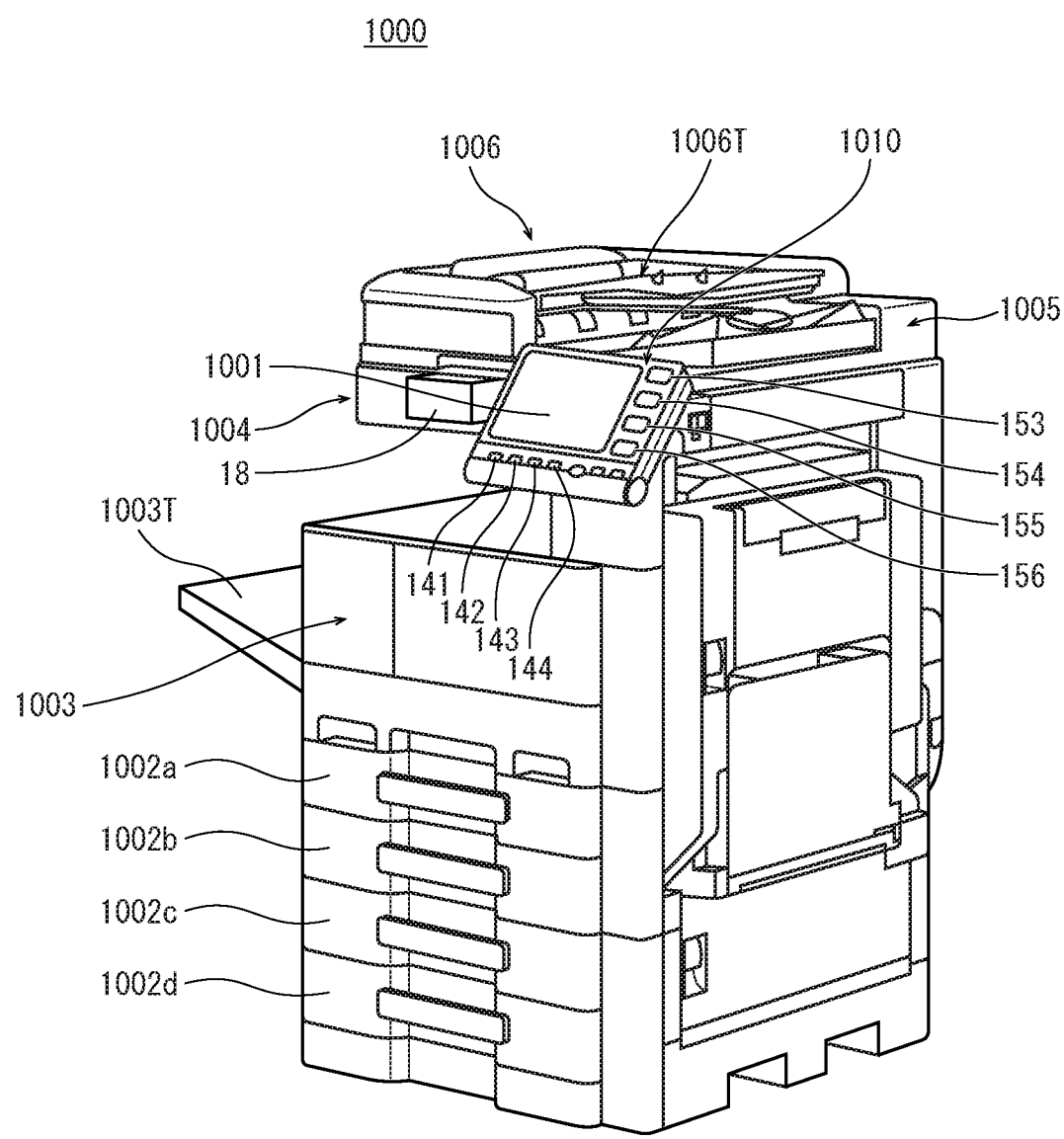
FIG. 1 is a diagram of the exterior of an image forming device 1000.

FIG. 1 illustrates the exterior of an image forming device 1000. The image forming device 1000 illustrated in FIG. 1 is a multifunction peripheral (MFP), and includes an operation panel 1010, paper cassettes 1002a, 1002b, 1002c, 1002d, an image former 1003, a scanner 1004, and a document holding cover 1005 integrated with an automatic document feeder 1006. The operation panel 1010 includes buttons 141, 142, 143, 144 for selecting the type of job to execute, such as copying, faxing, scanning, and printing, a touch panel display 1001 that presents settings for a selected job (print settings in the cases of copying and printing) to a user, and receives setting operations from a user, a start button 155 for receiving a job start operation, and a cancel button 156 for receiving job cancellation. When copy is selected as a job type, the scanner 1004 optically reads a document image, an image is formed on paper fed from the paper cassettes 1002a, 1002b, 1002c, 1002d, and the paper is ejected onto an ejection tray 1003T.

[2] Structure of Scanner 1004

Figure 2:
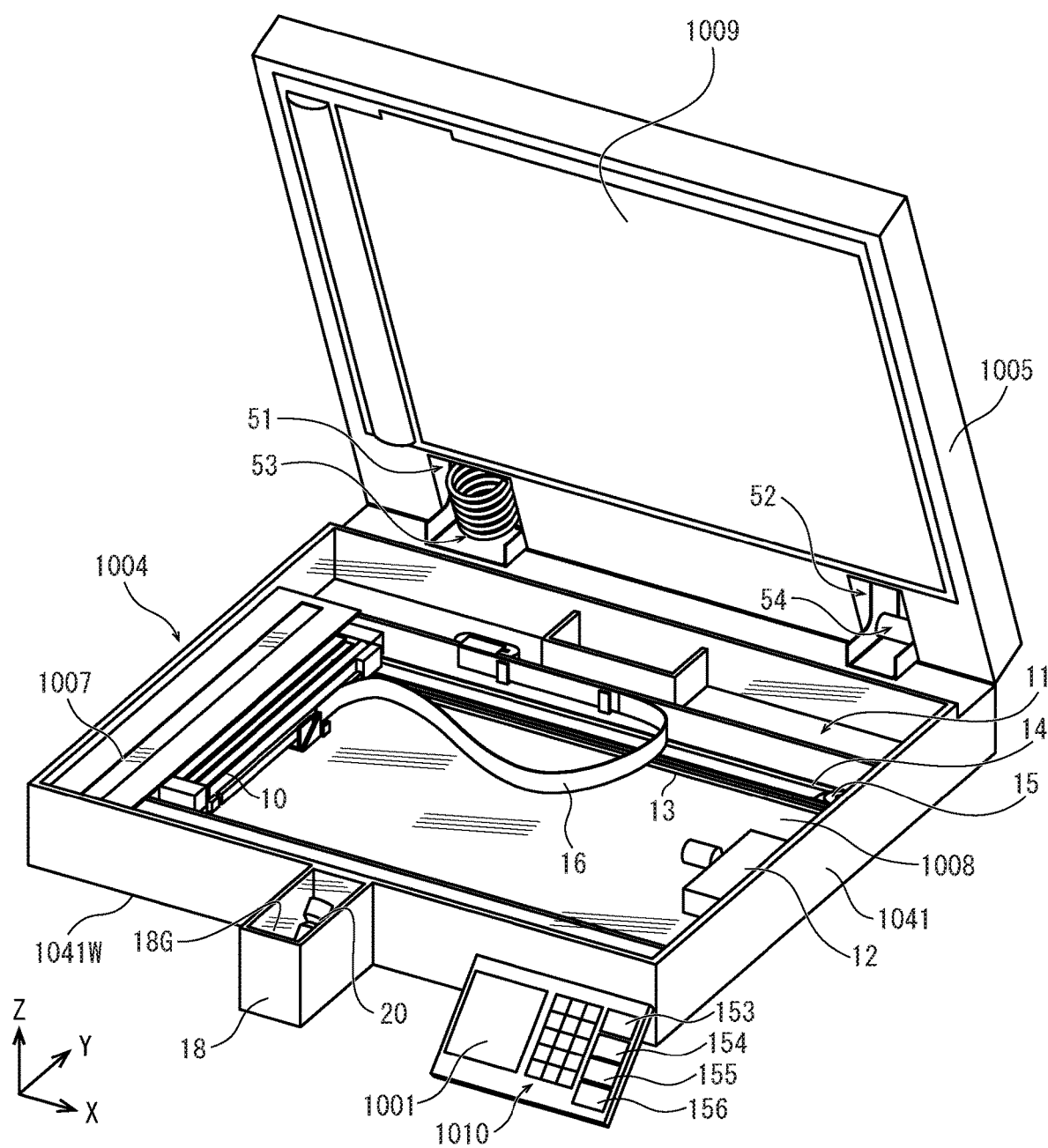
FIG. 2 is a perspective view diagram of an automatic document feeder 1006 in an open state when the image forming device 1000 is viewed from diagonally above.
Figure 3:
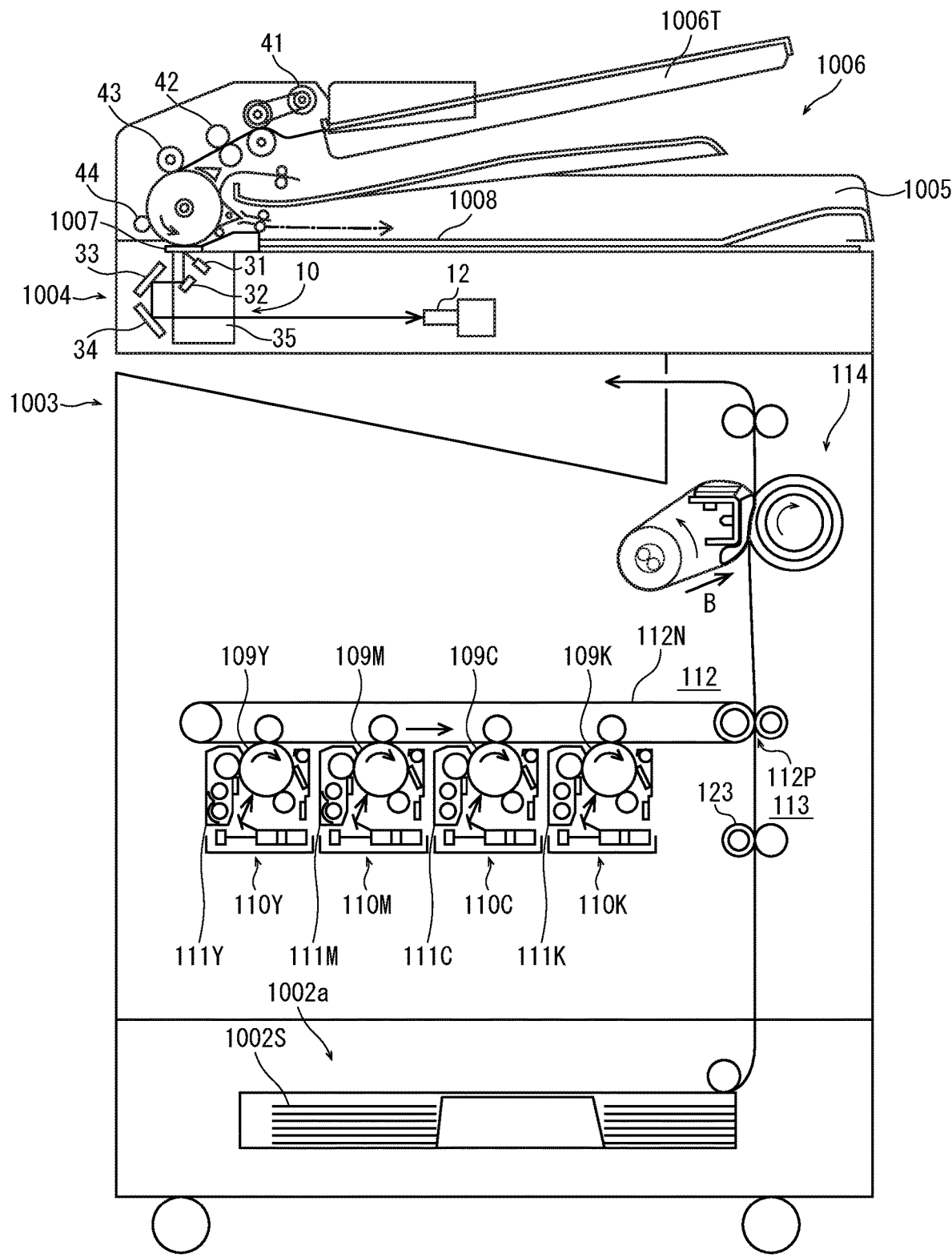
FIG. 3 is a diagram illustrating internal structure of an image former 1003, a scanner 1004, and the automatic document feeder 1006.

FIG. 2 is a perspective view diagram illustrating the automatic document feeder 1006 in an open state, and FIG. 3 is a diagram illustrating internal structure of the image former 1003, the scanner 1004, and the automatic document feeder 1006. As illustrated in FIG. 2, an exterior body 1041 that is the exterior of the scanner 1004 has an upper face opening, and slit glass 1007 and platen glass 1008 are fitted into the upper face opening. A scan unit 10, a carriage mechanism 11, and a line sensor 12 are housed in a space surrounded by the exterior body 1041, the slit glass 1007, and the platen glass 1008.

The carriage mechanism 11 includes a guide rail 13, a belt 14, a pulley 15, a drive motor (not illustrated), and the like. The scan unit 10 is supported by the guide rail 13, and receives a motive force from the drive motor via the belt 14 and the pulley 15 to move in an X axis direction.

The scan unit 10 is connected to a control system of the image former 1003, described later, via a flat cable 16. As illustrated in FIG. 3, the scan unit 10 illustrated in FIG. 2 includes an LED unit 31, a mirror 32, and a carriage 35, and reads documents by two methods, a sheet-through method and a document scan method. In the sheet-through method, documents in a stack of documents placed on a mounting table 1006T are fed out and conveyed one by one by rollers 41, 42, 43, 44 of the automatic document feeder 1006 to a position of the slit glass 1007 illustrated in FIG. 2. At this time, the scan unit 10 is moved to a position directly below the slit glass 1007 and is stationary at this position. A document passing over the slit glass 1007 is irradiated with light and light reflected therefrom is guided to the line sensor 12.

In the document scan method, the automatic document feeder 1006 is opened as illustrated in FIG. 2, a document is placed on the platen glass 1008, and the scan unit 10 is moved in the positive direction of the X axis. The scan unit 10 is configured such that when the carriage 35 is moved in the positive direction of the X axis, a set of mirrors 33, 34 moves at half the speed of the set of the mirrors 31, 32, thereby maintaining a constant distance from the document surface of the platen glass 1008 to the line sensor 12. In this way, the document placed on the platen glass 1008 is scanned while maintaining a constant distance from the document surface.

[3] Structure of Projector

The projector 20, which executes a preview display via projection, is described below with reference to FIG. 2. The exterior body 1041 of the scanner 1004 illustrated in FIG. 2 is provided with a projection portion 18 on a front side wall surface 1041W. The projection portion 18 has an upper face opening and glass 18G is fitted into the opening. The projector 20 is housed with an oblique orientation in an internal space of the projection portion 18 covered by the glass 18G. A reflector 1009 attached to a document holding surface of the document holding cover 1005 reflects light emitted by the scan unit 10 and also serves as a projection screen when the projector 20 projects.

The document holding cover 1005 of the automatic document feeder 1006 is swingably supported by the exterior body 1041 via two hinges 51, 52, as illustrated in FIG. 2. Of the hinges 51, 52, the hinge 51 is provided with a biasing mechanism that biases the automatic document feeder 1006 to make a free stop. The biasing mechanism includes a compression spring 53 and a cam mechanism (not illustrated) that converts force from the compression spring 53 into rotational force around a hinge axis of the hinge 51. The biasing mechanism balances rotational force due to weight of the automatic document feeder 1006 with rotational force due to elastic force of the compression spring 53. This equilibrium allows a user to stop the automatic document feeder 1006 at any rotation angle. As such a biasing mechanism including a compression spring and a cam mechanism, a biasing mechanism described in JP 2018-87777 can be used, for example.

A potentiometer (not illustrated) is attached to a hinge shaft 54 of the hinge 52 to detect an opening/closing angle of the document holding cover 1005 with respect to the platen glass 1008. The potentiometer outputs to the control system of the image former 1003. As such a potentiometer, a potentiometer described in JP 2014-7625 can be used, for example.

Figure 4A:
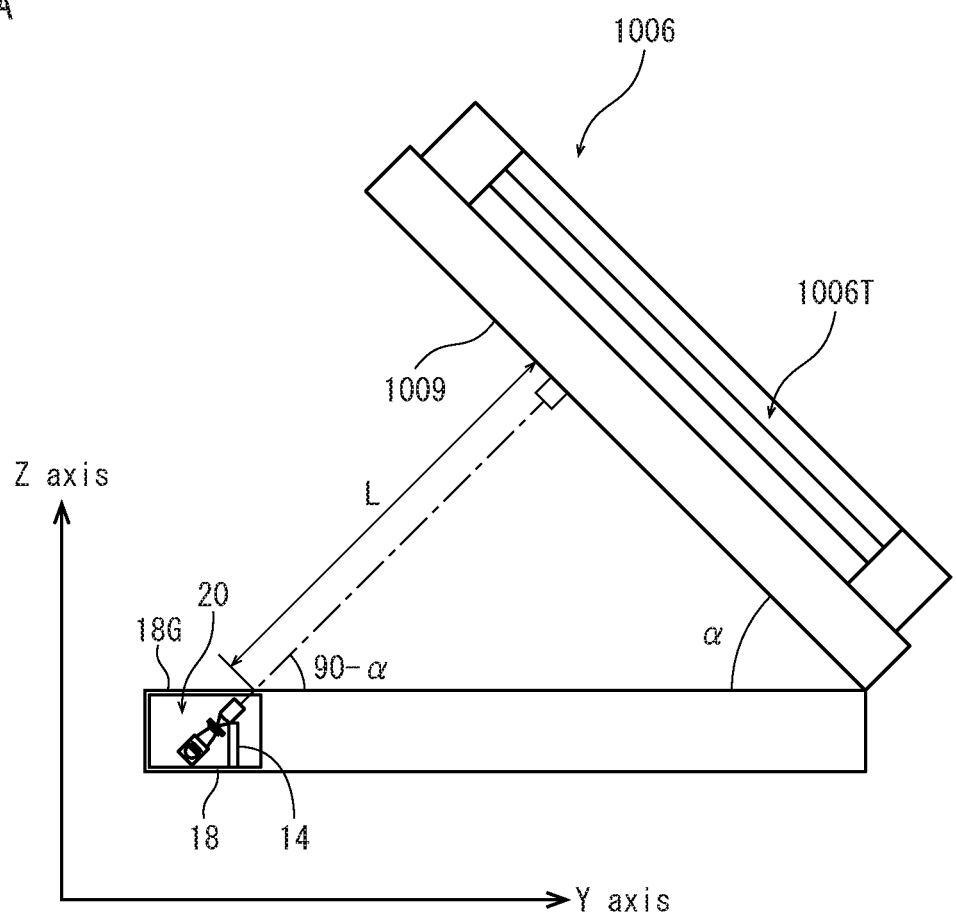
FIG. 4A is a diagram illustrating a positional relationship between an optical axis of a projector 20 and a reflector 1009.

FIG. 4A is a diagram illustrating a positional relationship between an optical axis of the projector 20 and the reflector 1009. The projector 20 is mounted at an angle of 90−α degrees from the positive direction of the Y axis. Because the projector 20 is mounted in this orientation, when a user opens the document holding cover 1005 and the potentiometer attached to the hinge 52 detects a swing angle α, an optical axis of the projector 20 is made perpendicular to the reflector 1009, as illustrated in FIG. 4A. When the projector 20 at the defined angle performs projection, a print image is projected onto the reflector 1009 of the document holding cover 1005.

Figure 4B:
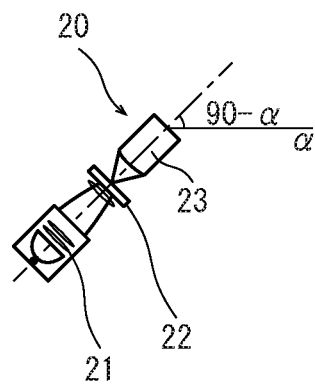
FIG. 4B is a diagram illustrating internal structure of the projector 20.

FIG. 4B is a diagram illustrating internal structure of the projector 20. As illustrated in FIG. 4B, the projector 20 includes an illumination optical system 21, a liquid crystal shutter 22 that switches between transmission and blocking of light emitted by the illumination optical system 21 on a pixel-by-pixel basis, and a projection optical system 23 that projects light transmitted through the liquid crystal shutter 22 onto the reflector 1009. A focal length of the projection optical system 23 is set based on a distance between the liquid crystal shutter 22 and the projection optical system 23, a projection distance L from the projector 20 to the reflector 1009, and vertical and horizontal widths of the liquid crystal shutter 22.

When focal length of the projection optical system 23 is f, and distance between the liquid crystal shutter 22 and a focal point of the projection optical system is a, a projection distance L is calculated by Expression 1, below, according to a lens formula 1/a+1/L=1/f.

$$L = \frac{af}{(a-f)} \qquad \text{[Expression 1]}$$

When vertical size of the liquid crystal shutter 22 is p, horizontal size of the liquid crystal shutter is q, a width $S_w$ of the projection screen is calculated by Expression 2, below.

$$S_w = \frac{qf}{(a-f)}, S_h = \frac{pf}{(a-f)} \qquad \text{[Expression 2]}$$

When resolution of the projector 20 is a number of horizontal pixels $R_w\times$ a number of vertical pixels $R_h$, and paper size selected in print settings is horizontal $S_w\times$vertical $S_h$, then horizontal width $P_w$ of one pixel on the projection screen is $P_w=S_w/R_w$ and vertical height $P_h$ is $P_h=S_h/R_h$.

Width of paper selected by a user in print settings is $F_w$, and height is $F_h$. In this case, a number of horizontal pixels $n_w$ of an image to be displayed on a projection screen is a value obtained by dividing the horizontal width $F_w$ of the paper by the horizontal width $P_w$ of one pixel on the projection screen (which is $S_w/R_w$). That is, $n_w=F_w\cdot R_w/S_w$. Similarly, a number of vertical pixels $n_h$ of an image to be displayed on the projection screen is a value obtained by dividing the vertical height $F_h$ of paper by the vertical height $P_h$ of one pixel (which is $S_h/R_h$), that is, $n_h=F_h\cdot R_h/S_h$. Image data for preview display is created with the number of horizontal pixels $n_w$ and the number of vertical pixels $n_h$ calculated as described above in the control system. Thus, image data for preview display is displayed on the projection screen at the paper size (horizontal $F_w\times$vertical $F_h$) set by a user in print settings.

Applying specific values as examples, size of the reflector 1009 is A3 paper size (420 mm×297 mm), $S_w$ is 420 mm, and $S_h$ is 297 mm. The distance a and the focal point f of the liquid crystal shutter 22 and the projection optical system 23 are set so as to satisfy Expression 2 when these values are substituted into Expression 2.

Resolutions of the projector 20 for business use are 640×480 (VGA), 800×600 (SVGA), 1024×768 (XGA), and 1280×800 (WXGA), and values divided by the number of horizontal pixels $n_w$ and the number of vertical pixels $n_h$ of these resolutions are the width $P_w$ and the height $P_h$ of one pixel.

When executing a preview display at a paper size selected by a user, an image processing engine (image processing engine 205 in FIG. 5) in the control system of the image former 1003 calculates a number of horizontal pixels and a number of vertical pixels to be used for the preview display by multiplying size of the reflector 1009 by a ratio of the paper size selected by a user to the number of horizontal pixels and the number of vertical pixels of the resolution of the projector 20.

As an example, when a user selects A3 paper, $F_w$ is 420 mm and $F_h$ is 297 mm, which are equal to $S_w$ and $S_h$, so the ratio of the size of the reflector 1009 to the paper size selected by the user is "1". Since the ratio is 1, display at the number of horizontal and vertical pixels of the resolution of the projector 20 results in an image of the print target being displayed on the reflector 1009 at A3 paper size.

As another example, when a user selects A4 paper, $F_w$ is 297 mm, $F_h$ is 210 mm, $F_w$ is 297/420 times $S_w$, and $F_h$ is 210/297 times $S_h$, and therefore display at 297/420 times the horizontal number of pixels and 210/297 times the vertical number of pixels of the resolution of the projector 20 results in an image of the print target being displayed on the reflector 1009 at A4 paper size. As described above, the ratios of vertical height and horizontal width of paper size selected by a user to vertical height and horizontal width of size of the reflector 1009 are calculated and multiplied by the number of vertical pixels and the number of horizontal pixels of the resolution of the projector 20, and therefore the number of vertical pixels and horizontal pixels required for full-scale preview display can be calculated.

When a preview display is executed using the reflector 1009 as the projection screen, a user can confirm a print target using the projection screen having the same display area as actual paper size to be printed. A preview display using a projection screen having the same display area as the paper size is referred as a "real preview", and the operation panel 1010 illustrated in FIG. 1 includes a real preview button 154 as a button for receiving an operation to execute a real preview.

In the real preview, the document holding cover 1005 is opened and the reflector 1009 is used as the projection screen, and therefore, depending on print content, there may be a desire to avoid the print content being seen by a third party in the vicinity of the device. In view of such a situation, the image forming device 1000 is provided with a dedicated button on the operation panel 1010 (a secure preview button 153 illustrated in FIG. 1). By pressing the secure preview button 153, an instruction from a user that security is desired is received, and when such an instruction is made, projection by the projector 20 is canceled and display on the touch panel display 1001 is used instead. An area of a display area of the touch panel display 1001 is considerably smaller than the projection area of the projector 20, and a viewing angle is more limited, and therefore, when a user is standing in front of the image forming device 1000, it is very difficult for a third party to view the display content of the touch panel display 1001 from a position behind the user. Switching to the display on the touch panel display 1001 by pressing the secure preview button 153 makes it possible to prevent a print target from being seen by a third party, and therefore security of the print target can be maintained

[4] Structure of Image Former 1003

(4-1) Components for Electrophotographic Image Forming

As illustrated in FIG. 3, as components for electrophotographic image forming, the image former 1003 includes: exposure units 110Y, 110M, 110C, 110K that expose photoreceptor drums 109Y, 109M, 109C, 109K to form electrostatic latent images based on an image read by the scanner 1004; developer units 111Y, 111M, 111C, 111K that develop electrostatic latent images obtained by the photoreceptor drums 109Y, 109M, 109C, 109K to obtain toner images; a conveyor unit 113 that conveys paper fed from paper cassettes 1002a, 1002b, 1002c, 1002d (in FIG. 3, the paper cassettes 1002b, 1002c, 1002d are omitted, and only the paper cassette 1002a is illustrated); a transfer unit 112 that transfers toner images obtained by developing onto an intermediate transfer belt 112N, conveys the toner images to a secondary transfer position 112P, and transfers the toner images onto paper at the secondary transfer position 112P; and a fixing unit 114 that fixes a toner image transferred onto paper via heat and pressure.

(4-2) Control System of Image Former 1003

Figure 5:
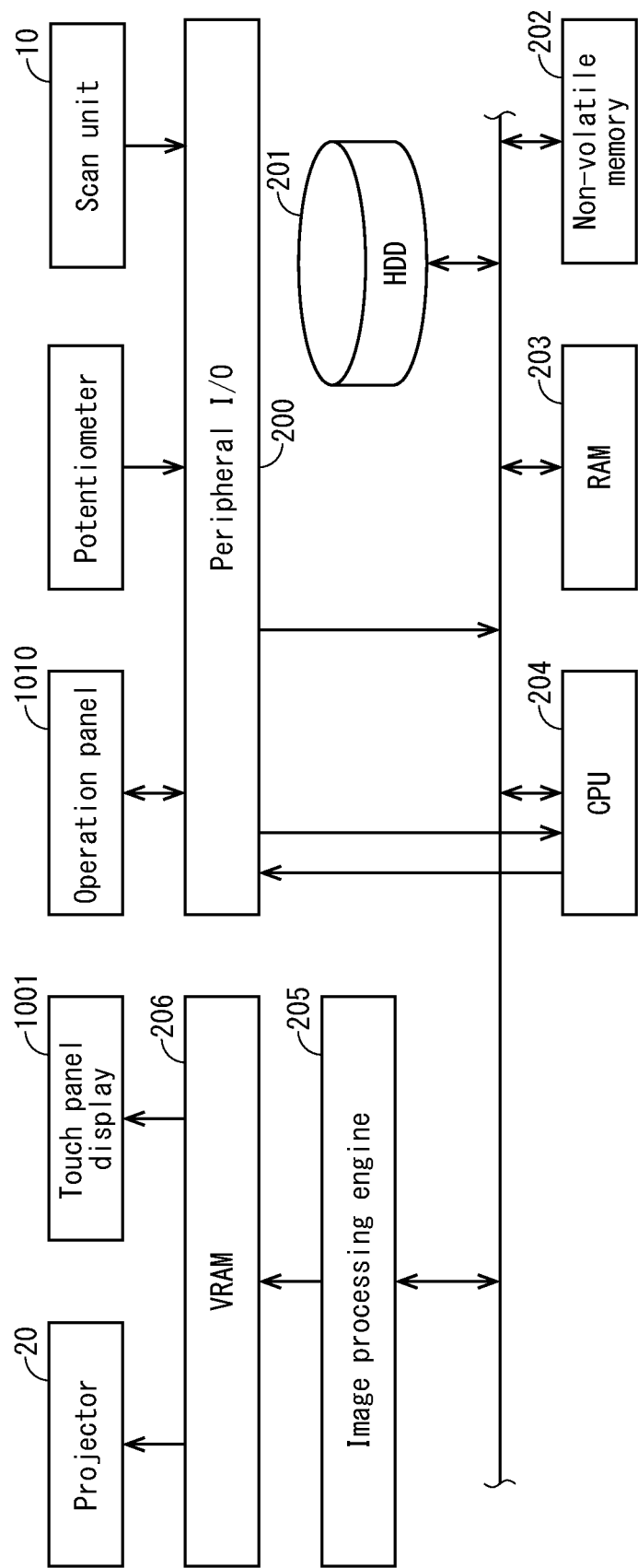
FIG. 5 is a diagram illustrating structure of a control system of the image former 1003.

FIG. 5 illustrates structure of a control system of the image former 1003. As illustrated in FIG. 5, the control system of the imager former 1003 includes a peripheral input/output (I/O) 200, a hard disk drive (HDD) 201, a non-volatile memory 202, a random access memory (RAM) 203, a central processing unit (CPU) 204, the image processing engine 205, and a video RAM (VRAM) 206. For simplicity, components that control the exposure units 110Y, 110M, 110C, 110K, the developing units 111Y, 111M, 111C, 111K, the conveyor unit 113, and the fixing unit 114 illustrated in FIG. 3 are omitted from FIG. 5.

A user operation of the touch panel display 1001 or the operation panel 1010, a swing angle detected by the potentiometer, and video input from the scan unit 10 are inputted to the control system via the peripheral I/O 200 and sent to the CPU 204. The CPU 204 converts video input from the scan unit 10 into image data and writes the image data to the HDD 201.

The non-volatile memory 202 stores default values for print settings and a control program for executing preview display.

The default values for print settings are read into the RAM 203 and temporarily stored there.

The CPU 204 overwrites the print settings read into the RAM 203 in response to user operations on the touch panel display 1001 and the operation panel 1010. When the start button 155 (see FIG. 1) of the operation panel 1010 is pressed, the CPU 204 executes a job such as copying, based on data indicating the print settings obtained by overwriting the RAM 203 and the image data stored in the HDD 201.

When executing a job, the image processing engine 205 executes processing converting the image data stored in the HDD 201 into a print format. Further, when executing a preview display, the image data converted into the print format is further converted into a display format and written to the VRAM 206. Processing executed by the CPU 204 when executing a preview display is as illustrated in FIG. 6 and FIG. 7.

[5] Control Content for Preview Display

Figure 6:
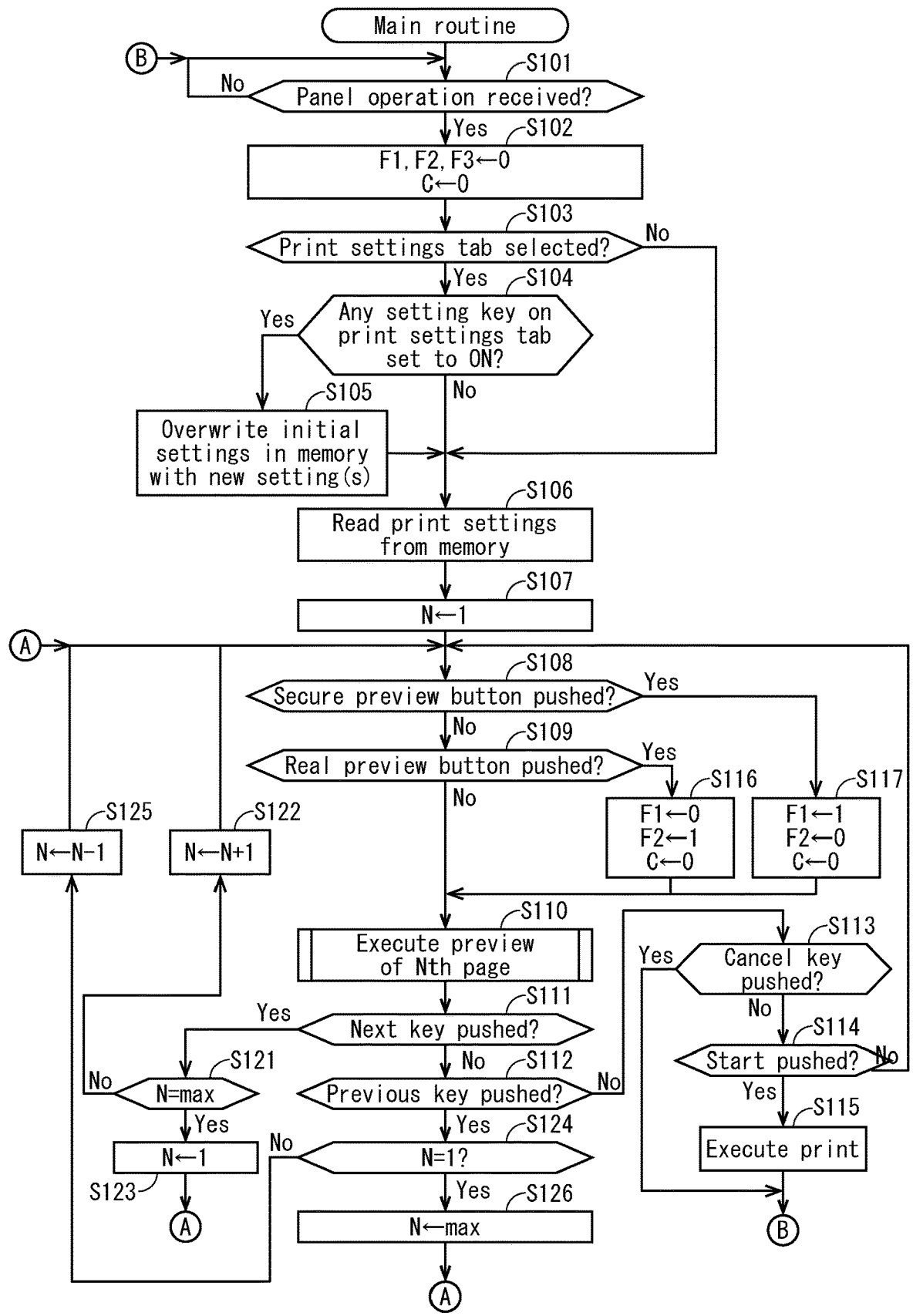
FIG. 6 is a flowchart of a main routine illustrating a preview display procedure.
Figure 7:
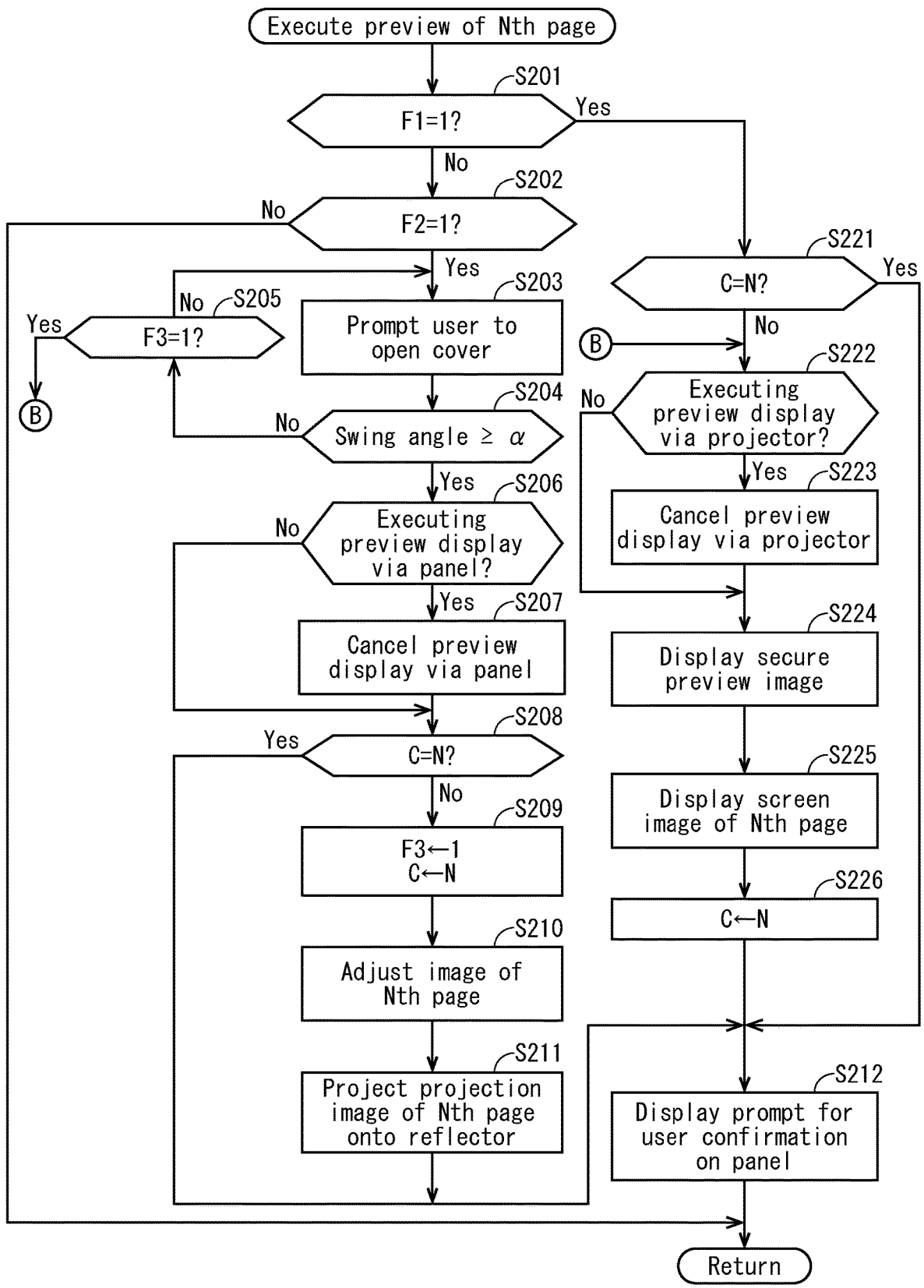
FIG. 7 is a flowchart of a subroutine illustrating a real preview and secure preview procedure.

The following describes processing to be executed by the CPU 204 for a preview display, with reference to FIG. 6 and FIG. 7. The following variables are used in the flowcharts of FIG. 6 and FIG. 7. Variable N indicates a page to be printed, in a range from 1 to Max, where Max indicates a total number of pages to be printed.

Variable F1 is a flag (panel flag) with an initial value of 0 ("off") that is set to 1 ("on") when a user presses the secure preview button 153. Variable F2 is a flag (projection flag) with an initial value of 0 ("off") that is set to 1 ("on") when a user presses the real preview button 154. Variable F3 is a flag (open flag) that indicates whether the document holding cover 1005 is open, i.e., whether the swing angle is equal to or greater than $\alpha$. Variable C is a counter indicating the number of pages for which a preview has been completed by the projector 20 or the touch panel display 1001.

(5-1) Print Setting

Figure 8A:
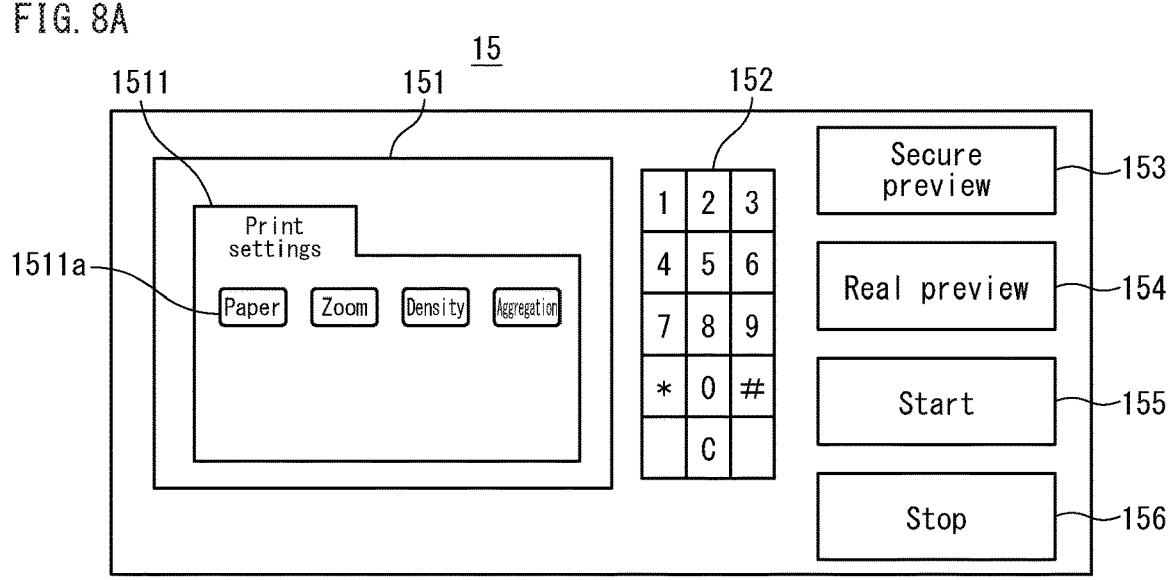
FIG. 8A is a diagram illustrating an example of a print settings tab 1511.

In step S101, processing waits for an operation from the operation panel 1010. If an operation is received ("Yes" in step S101), the open flag F3, the panel flag F1, the projection flag F2, and the display counter C are initialized to "0" (step S102), and processing proceeds to step S103. Step S103 is a determination as to whether or not the print settings tab 1511 in FIG. 8A is selected. The print settings tab 1511 includes buttons 1511a for accepting paper setting, zoom setting, density setting, and aggregation setting. When one of the buttons 1511a on the print settings tab is pressed, in step S104 it is determined which button (hereinafter also referred to as "key") on the print settings tab is pressed. If any of zoom setting, density setting, and aggregation setting are pressed, and a key is set to ON, then in step S105, data indicating initial print settings copied to the RAM 203 from the non-volatile memory 202 is overwritten by the setting from the print settings tab 1511. If none of the keys on the print settings tab 1511 are set, the initial print settings remain stored in the RAM 203. When any one of the buttons on the print settings tab 1511 is pressed, or when two or more the buttons on the print settings tab are pressed, corresponding default values read from the RAM 203 are overwritten.

(5-2) Preview is not Designated

Figure 8B:
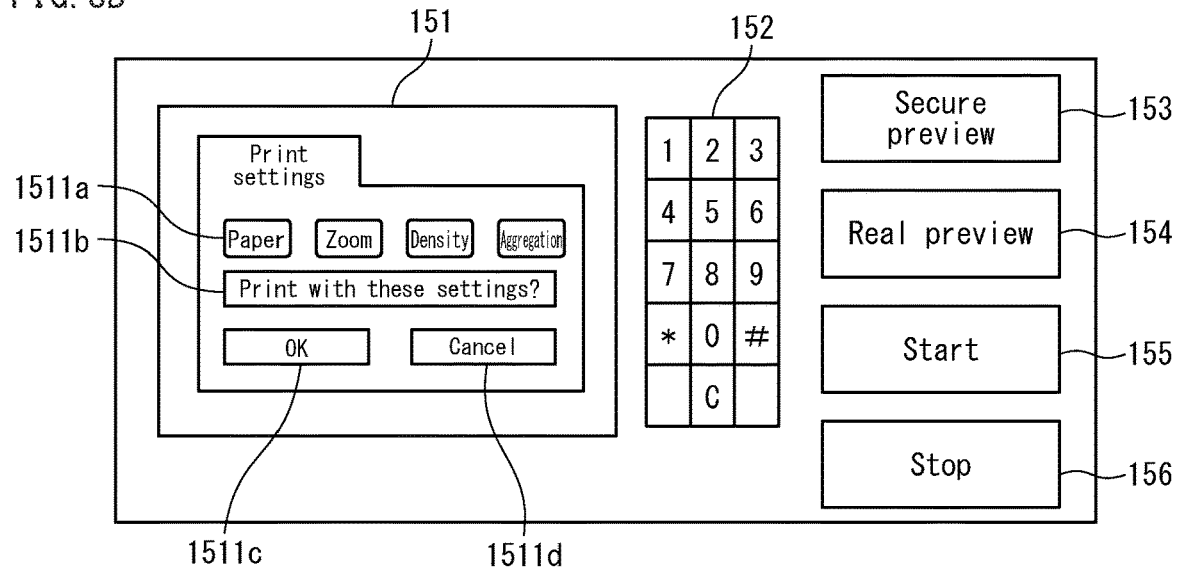
FIG. 8B is a diagram illustrating an example of a print setting confirmation screen.

Subsequently, print settings for which an initial value is stored, and print settings overwritten according to operations with respect to the print settings tab 1511 are read from the RAM 203 (step S106). Subsequently, a screen illustrated in FIG. 8B is displayed, and a processing loop from step S107 to step S114 is started. The screen of FIG. 8B is a print setting confirmation screen, and includes a message 1511b asking for confirmation of the print settings, an OK key 1511c for accepting print execution, and a cancel key 1511d for accepting cancellation of print execution.

After initializing the variable N to 1 in step S107, the loop of steps from S108 to S114 is executed. Step S108 is a determination of whether or not the secure preview button 153 has been pressed, and step S109 is a determination of whether or not the real preview button 154 has been pressed.

Step S110 is execution of a preview display of the Nth page. Step S111 is a determination of whether or not a key to switch to a next page has been pressed, and step S112 is a determination of whether or not a key to switch to a previous page has been pressed, with respect to the preview display of the Nth page. Step S113 is a determination of whether or not a cancel key has been pressed, and step S114 is a determination of whether or not a start button has been pressed.

When neither the secure preview button 153 nor the real preview 154 button has been pressed, steps S108 and S109 result in "No", and the panel flag F1 and the projection flag F2 both remain set to the initial value of "0". When the panel flag F1 and the projection flag F2 are still set to "0", processing in step S110 is as follows. FIG. 7 is a flowchart of the subroutine of step S110.

The subroutine includes a determination of whether the panel flag F1 is set to "1" (step S201) and a determination of whether the projection flag F2 is set to "1" (step S202). When neither the secure preview button 153 nor the real preview button 154 are pressed, these flags are still set to "0", so the results of steps S201 and S202 are "No", and the subroutine of FIG. 7 returns to the main routine without further processing. In a state where the secure preview button 153 and the real preview button 154 are not pressed, this loop of steps S108 to S114 repeats.

(5-3) Real Preview Selection

In steps S108 to S114, when the real preview button is pressed, step S109 results in "Yes", and in step S116, the panel flag F1 is set to 0 ("off"), the projection flag F2 is set to 1 ("on"), and the display counter C is set to 0. Subsequently, a preview display of the Nth page is executed according to the flowchart of the subroutine illustrated in FIG. 7 (step S110).

Figure 8C:
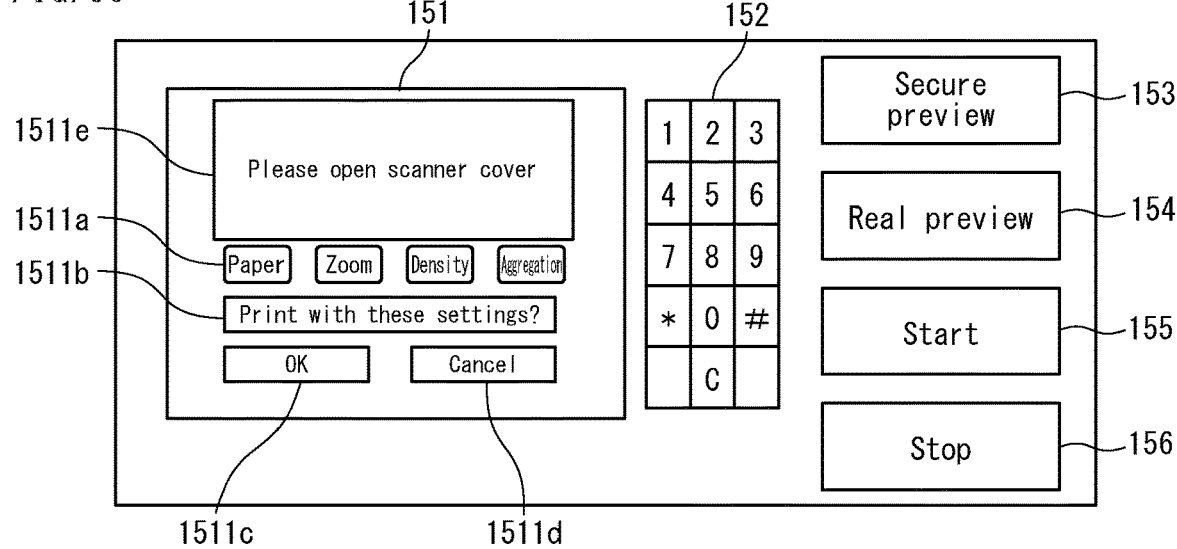
FIG. 8C is a diagram illustrating a screen for notifying a user that a document holding cover 1005 is to be opened.

When the projection flag F1 is set to 1, the touch panel display 1001 is set to display the content illustrated in FIG. 8C, in which a message 1511e prompting that the document holding cover 1005 be opened is presented to a user (step S203), and a determination is made of whether or not the swing angle is $\alpha$ or more, as detected by the potentiometer (step S204). If less than $\alpha$ ("No" in step S204), processing proceeds to step S205. Step S205 is a determination of whether the open flag F3 is set to 1. The real preview selection in (5-3) is the first selection, and the open flag F3 has not been updated since it was set to "0" in step S102, and therefore step S205 results in "No" and processing returns to step S203. Steps S203 to S205 are repeated as the swing angle of the document holding cover 1005 is less than $\alpha$.

When a user opens the document holding cover 1005 in response to the prompting of step S203 and the swing angle detected by the potentiometer becomes $\alpha$ or more ("Yes" in step S204), it is determined whether the touch panel display 1001 is executing a preview display. The real preview selection in (5-3) is the first selection, and the touch panel display 1001 is not executing a preview display, and therefore step S206 results in "No" and step S207 is skipped.

In step S208, it is determined whether the display counter C and the variable N are equal. While the variable C remains at 0, the variable N is set to "1", and therefore step S208 results in "No" and steps S209 to S211 are executed. Specifically, the open flag F3 is set to 1, the display counter C is set to N (step S209), and image data of the Nth page is created.

The image processing engine 205, after performing image quality adjustment such as shading correction and gradient correction on image data in the job data, converts the image data into a print format according to the zoom, density, and aggregation set via the print settings tab 1511. The image data converted to the print format is then converted into a display format. At this time, the number of vertical pixels and horizontal pixels of the image of the Nth page for the preview display are calculated from a ratio of the vertical height and horizontal width of the reflector 1009, which is the projection screen, to the vertical height and horizontal width of the paper selected by a user, then after the image data is converted to the number of vertical pixels and horizontal pixels, the image is written to the VRAM 206. Then output of a video signal from the VRAM 206 to the projector 20 is started, and a signal processor 211 adjusts brightness and color temperature (step S210). Then a projection image of the Nth page is projected onto the reflector 1009 (step S211), and the touch panel display 1001 displays a request for confirmation by a user (step S212).

Figure 9A:
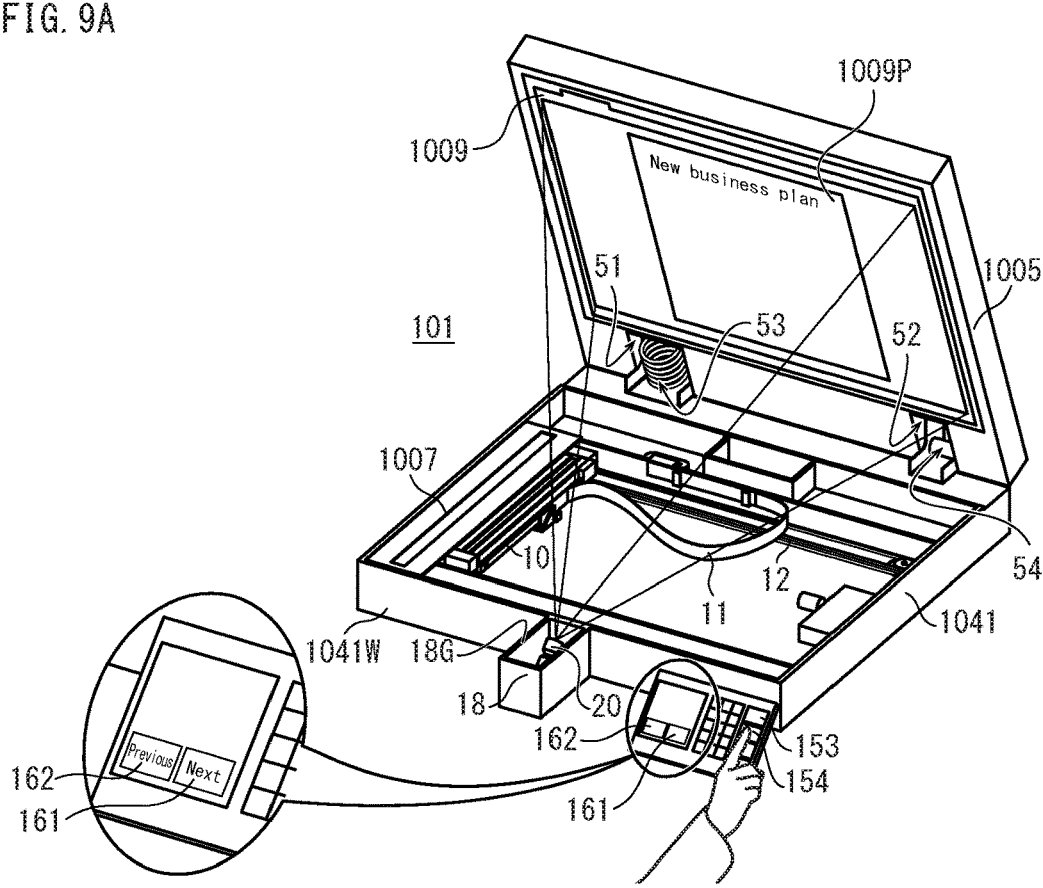
FIG. 9A is a diagram illustrating content projected by the projector 20 when a real preview button 154 is pushed and display content of a touch panel display 1001.
Figure 10A:
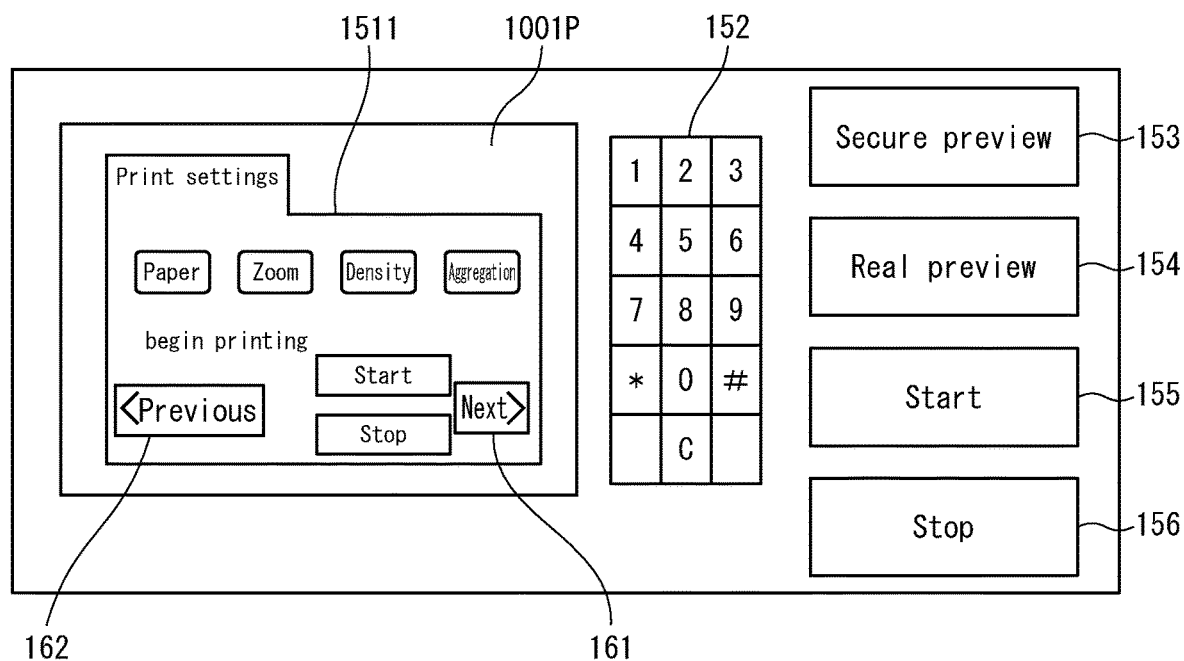
FIG. 10A is a diagram illustrating content displayed by the touch panel display 1001 when the real preview button 154 is pushed.

FIG. 9A illustrates projection content by the projector 20 and display content by the touch panel display 1001 when the real preview button 154 is pressed. A preview display 1001P of image data is not displayed on the touch panel display 1001, and the print settings tab 1511 is still displayed, as illustrated in FIG. 10A. Towards the bottom of the print settings tab 1511 are arranged a next page key 161 for receiving an operation to switch to a next page and a previous page key 162 for receiving an operation to switch to a previous page during projection by the projector 20. Subsequently, processing returns to the main routine, and steps S108 to S114 again begin to repeat.

(5-4) Avoiding Duplicate Projection

After executing a preview display on the touch panel display 1001, the display counter C is set to the variable N. When the secure preview button 153 and the real preview button 154 are not pressed and step S108 is to be executed again, step S201 results in "No" and step S202 results in "Yes". If the document holder cover 1005 remains open, step S204 results in "Yes" and step S206 results in "No", and in step S208 it is determined whether the display counter C has the same value as the variable N. Step S208 is a determination for avoiding duplication of preview display on the touch panel display 1001. After projection by the projector 20, the display counter C is set to the variable N, and therefore the display counter C and the variable N match. Thus, steps S209 to S211 are skipped, and processing returns to the main routine of FIG. 6. Duplicate projections of the Nth page are avoided by skipping steps S209 to S211.

(5-5) Switching to Secure Preview

When the secure preview button 153 is pressed after pressing the real preview button 154, step S108 in the loop of steps S108 to S114 results in "Yes", the panel flag F1 is set to 1, the projection flag F2 is set to 0, and the display counter C is set to 0 (step S117), and subsequently, a preview display of the Nth page is executed according to the flowchart of the subroutine illustrated in FIG. 7. The panel flag F1 is set to 1, and therefore step S201 results in "Yes", and in step S221 it is determined whether or not the display counter C matches the variable N.

The display counter C is set to "0" by the pressing of the secure preview button 153, and therefore step S221 results in "No", and processing proceeds to step S222. In step S222 it is determined whether or not a preview display is being executed by the projector 20. In (5-3), before (5-5), the preview display via projection by the projector 20 is executed, and therefore step S222 results in "Yes", and the preview display via projection by the projector 20 is cancelled (step S223).

Subsequently, a secure preview screen is displayed (step S224), a preview image of the Nth page is displayed (step S225), and the display counter C is set to N to indicate that the preview image of the Nth page is displayed (step S226). Finally, a button is displayed asking for user confirmation (step S212), and processing returns to the main routine.

Figure 9B:
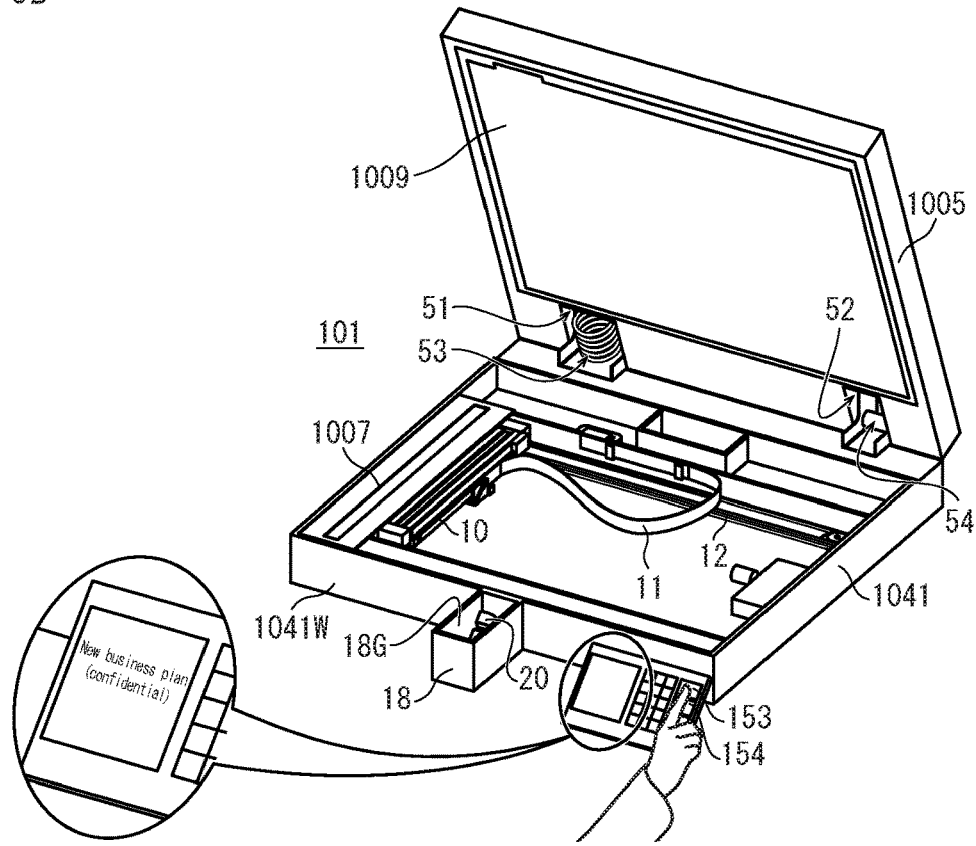
FIG. 9B is a diagram illustrating an example of a secure preview display of the touch panel display 1001.
Figure 10B:
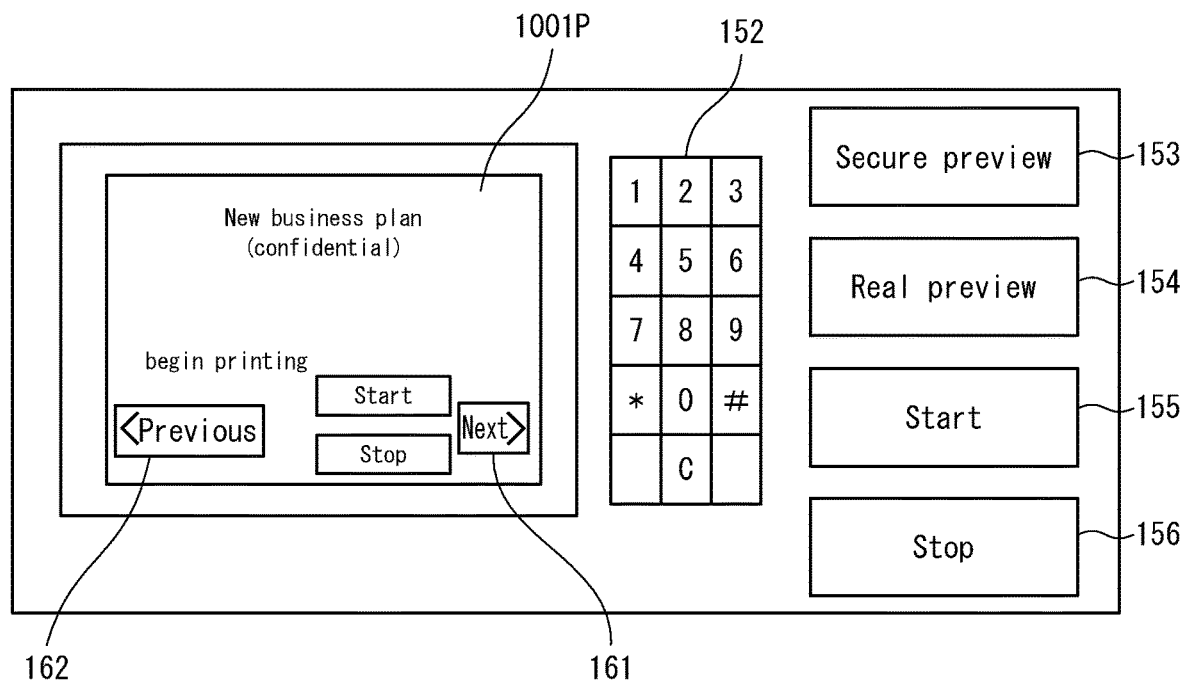
FIG. 10B is a diagram illustrating content displayed by the touch panel display 1001 when a secure preview button 153 is pushed.

When the secure preview button is pressed, the image of the Nth page is switched from projection by the projector 20 to display by the touch panel display 1001, as illustrated in FIG. 9B. As a result, confirmation of the print image can be confirmed while keeping contents of highly confidential print documents hidden. FIG. 10B illustrates content displayed by the touch panel display 1001 when the secure preview button 153 is pushed. The touch panel display 1001 displays the preview display 1001P of image data, below which are arranged the next page key 161 for receiving an operation to switch to a next page and a previous page key 162 for receiving an operation to switch to a previous page. If real preview is selected after selection of the secure preview, step S206 results in "Yes". Thus, in step S207, preview display on the touch panel display 1001 is cancelled, processing proceeds to steps S208 to S211, and a projection image of the Nth page is projected onto the reflector 1009 to execute a preview display.

(5-6) when Cover 1005 is Closed During Projection

When the cover 1005 is closed during projection onto the reflector 1009 while a preview display is being executed via projection by the projector 20 during the loop of steps S108 to S114, step S204 results in "No", and processing proceeds to step S205. Step S205 is a determination of whether the open flag F3 is set to 1. The open flag F3 is set to 1 when the swing angle of the hinges 51, 52 of the document holding cover 1005 becomes α or more. When the swing angle detected by the potentiometer becomes less than α while the open flag F3 is set to 1, it means that the document holding cover 1005 has been opened and then closed. In this case, step S205 results in "Yes", processing proceeds to step S222, and a secure preview screen is displayed using the touch panel display 1001.

(5-7) Page Switching

When the next page key 161 is pressed ("Yes" in step S111), if the variable N is not equal to the maximum number of pages ("No" in step S121), the variable N is incremented (step S122), and processing proceeds to step S108. If the variable N is equal to the maximum number of pages ("Yes" in step S121), the variable N is set to 1 (step S123), and processing proceeds to step S108.

When the previous page key 162 is pressed ("Yes" in step S112), if the variable N is not set to 1 ("No" in step S124), the variable N is decremented (step S125), and processing proceeds to step S108. If the variable N is set to 1 ("Yes" in step S124), the variable N set to the maximum number of pages (step S126), and processing proceeds to step S108.

When the preview button is not pressed, processing proceeds to step S108 without going through steps S113, S114. Given that the projection flag F2 or the panel flag F1 is set to 1 on a previous loop, processing proceeds to steps S209 through S211 or steps S221 through S226. The variable N has changed, and therefore the display counter C and the variable N do not match. Thus, by executing a preview via projection by the projector 20 or via display by the touch panel display 1001, the preview of a page corresponding to the variable N after the increment/decrement is executed.

(5-8) End Condition

If any page is being previewed and a user presses the start key while steps S108 through S114 are looping, step S114 results in "Yes" and printing is executed by controlling the exposure units 110Y, 110M, 110C, 110K, the developing units 111Y, 111M, 111C, 111K, the transfer unit 112, the conveyor unit 113, and the fixing unit 114 of the image former 1003. On the other hand, if a user presses the cancel key, step S113 results in "Yes" and processing returns to step S101.

[6] Review

As described above, according to at least one embodiment, when a print target contains confidential content and there is a third party in the vicinity, a preview display using the touch panel display 1001 is selected by pressing the secure preview button 153, and therefore it is possible to prevent displayed content from being seen by the third party. Further, when there is no content to be kept confidential in an image, or there is no third party in the vicinity, a preview display using projection by the projector 20 can be selected by pressing the real preview button 154. Thus, opportunities for using image confirmation by projection can be increased while also maintaining confidentiality of confidential print content.

An image forming device reflecting one aspect of the present invention executes a preview display of an image to be printed, the image forming device including: a projector; a panel display; a receiver that receives an instruction indicating whether or not to implement security in the preview display; and a controller that, when an instruction to implement security is not received, controls the projector to execute the preview display according to a first mode that represents the image to be printed at a display area equal to or larger than a defined size, and when an instruction to implement security is received, controls the projector and the panel display to execute the preview display according to a second mode that represents the image to be printed at a display area less than the defined size.

According to at least one embodiment, the image forming device further includes an image reader that reads media and outputs image data indicating read content. The image to be printed is obtained by converting image data output by the image reader into a print format according to print settings set by a user, and the defined size is size of a sheet selected in the print settings by a user.

According to at least one embodiment, the image forming device further includes a memory that stores image data converted into a print format. The projection unit and the panel display unit share the image data in the print format stored in the memory at a time of the preview display.

According to at least one embodiment, the image data converted to the print format consists of multiple pages of image data, and when a user instructs that pages be switched, the controller causes execution of the preview display according to the first mode or the second mode with respect to a previous page or a next page of the multiple pages of image data.

According to at least one embodiment, the image forming device further includes an automatic document feeder (ADF) and a document holding cover integrated with the ADF that can be switched between a closed position and an open position. The media is a plurality of documents, the image reader is a scanner, the ADF is disposed on the scanner, and the ADF feeds each of the documents to a position where the scanner reads the documents when the document holding cover is in the closed position, and the projector projects the image to be printed onto a document holding surface of the document holding cover in the open position.

According to at least one embodiment, after starting projection onto the document holding surface of the document holding cover, when the document holding cover is switched from the open position to the closed position, the controller changes the preview display from the first mode to the second mode.

According to at least one embodiment, the image forming device further includes platen glass and a document holding cover. The media is a document, the image reader is a scanner, and the document to be read is placed on the platen glass. The document holding cover's position can be changed between a closed position covering the platen glass and an open position that does not cover the platen glass. The projector projects the image to be printed onto a document holding surface of the document holding cover in the open position.

According to at least one embodiment, when the document holding cover is switched from the open position to the closed position, the controller changes the preview display from the first mode to the second mode.

According to at least one embodiment, the media is portable media and the image reader is a media reader that reads image data from the portable media.

According to at least one embodiment, the projector projects the image to be printed onto a wall surface in the vicinity of the image forming device.

According to at least one embodiment, the control by the controller according to the second mode cancels projection of the image to be printed by the projector and causes display of the image to be printed only on the panel display.

According to at least one embodiment, the control by the controller according to the first mode causes the projector to project the image to be printed and also causes the panel display to display the image to be printed, and the control by the controller according to the second mode cancels projection of the image to be printed by the projector and causes display of the image to be printed only on the panel display.

According to at least one embodiment, the control by the controller according to the second mode causes the projector to project the image to be printed at a reduced size smaller than the defined size.

[7] Modifications

At least one embodiment has been describe above, but the present disclosure is of course not limited to an embodiment described above. The following modifications are included in the scope of the present disclosure.

(1) The secure preview button 153 and the real preview button 154 have been described as push buttons provided on the operation panel 1010, but are not limited to this. The secure preview button 153 and the real preview button 154 may be displayed on the touch panel display 1001 as graphical user interface (GUI) buttons. Further, the secure preview button 153 and the real preview button 154 may be a toggle switch or toggle button, and may be a GUI element that functions as a toggle switch or toggle button.

Figure 11:
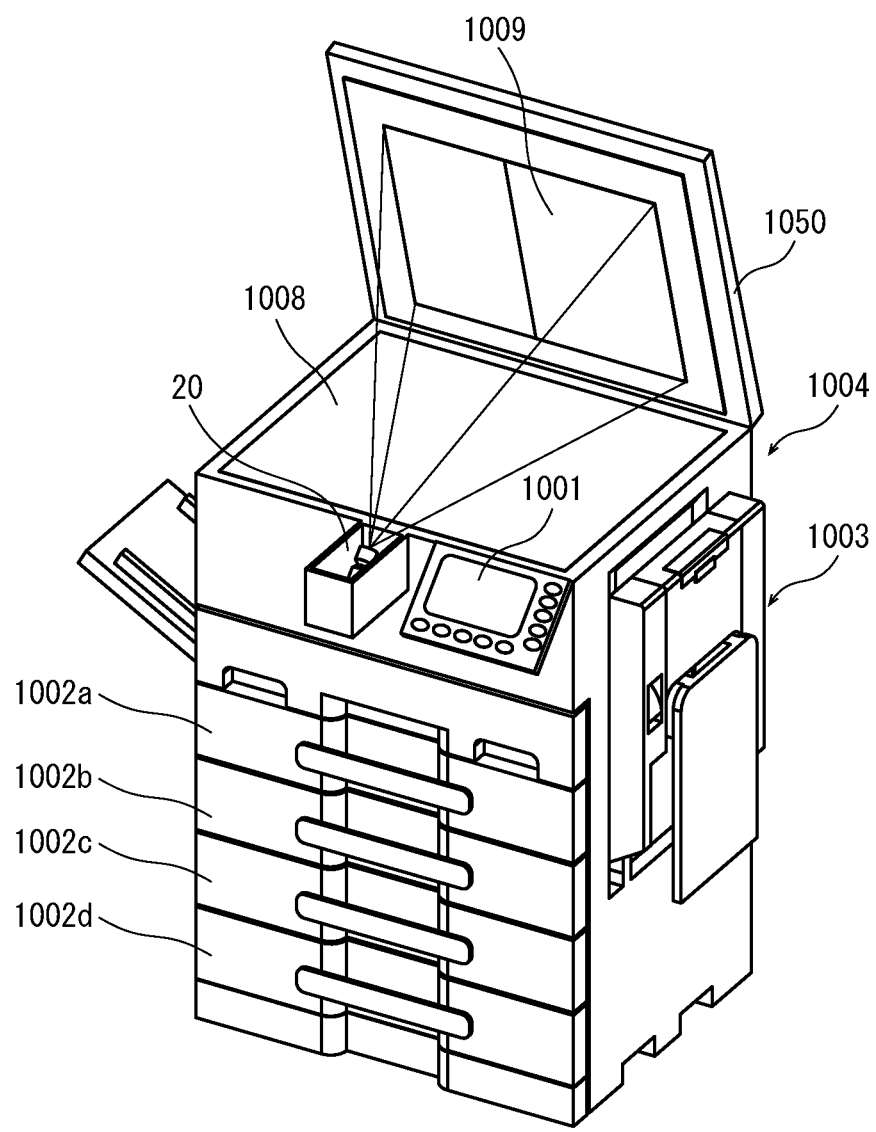
FIG. 11 is a diagram illustrating an example of projection using a document holding surface of a platen cover 1050 that covers platen glass 1008 as a projection screen.

(2) According to at least one embodiment, the reflector 1009 of the document holding cover 1005 integrated with the automatic document feeder 1006 is used as the projection screen of the projector 20, but the present disclosure is not limited to this. According to at least one embodiment, the image forming device does not include the automatic document feeder 1006, and the image forming device only supports a method in which a user manually sets a document on the platen glass 1008. As illustrated in FIG. 11, the projector 20 can project onto the reflector 1009 provided on a document holding surface of a platen cover 1050 for covering the platen glass 1008. Like the automatic document feeder 1006, the platen cover 1050 is supported by a hinge (not illustrated) at the back side of the device, and is swingable about the hinge. According to at least one embodiment, when the platen cover 1050 is closed, projection by the projector 20 is stopped and the touch panel display 1001 executes a preview display of image data to be printed.

Figure 12:
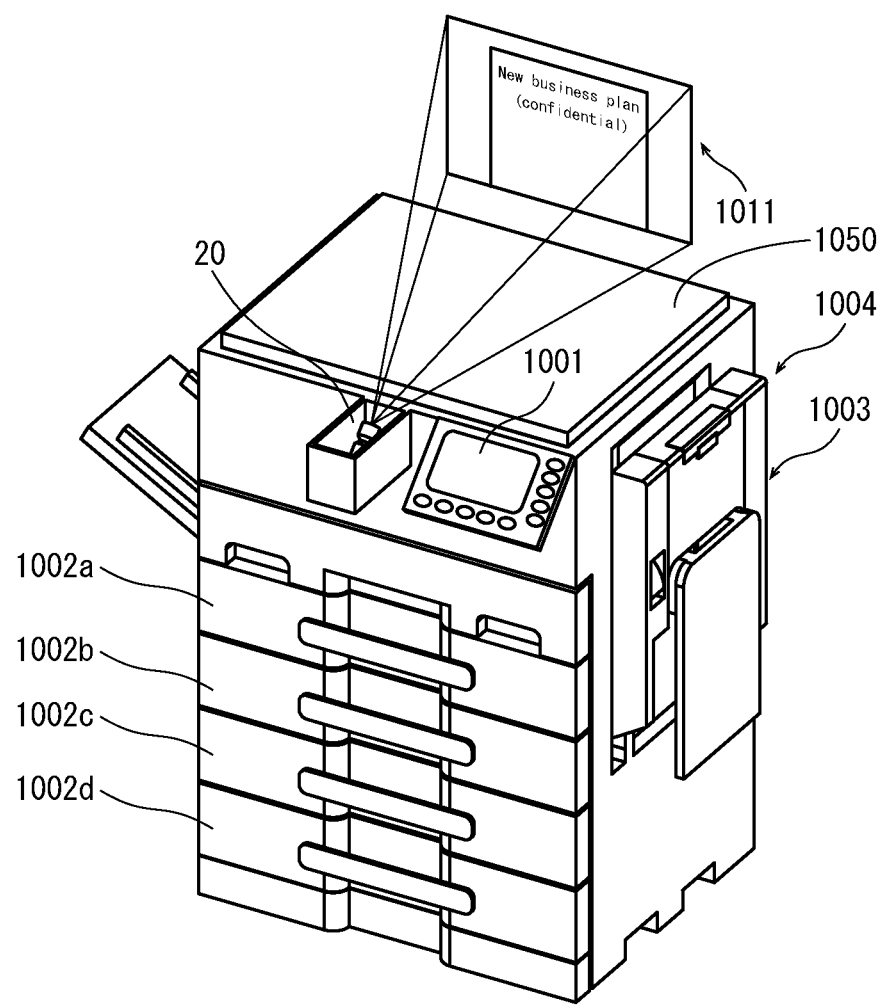
FIG. 12 is a diagram illustrating an example of projection using a wall surface behind the image forming device 1000 as a projection screen for the projector 20.

(3) According to at least one embodiment, the reflector 1009 of the document holding cover 1005 integrated with the automatic document feeder 1006 is used as the projection screen of the projector 20, but the present disclosure is not limited to this. FIG. 12 illustrates an example of projection using a wall surface behind the image forming device 1000 as a projection screen for the projector 20. In this case, when the platen cover 1050 is opened, preview display by projection is continued, and when the platen cover 1050 is closed, preview display by projection is stopped.

(4) According to at least one embodiment, when a user wishes to execute a real preview by pressing the real preview button 154, a preview display on the touch panel display 1001 is cancelled, and the next page key, the previous page key, and the print settings tab 1511 are displayed, but the present disclosure is not limited to this. According to at least one embodiment, when a user wishes to execute a real preview, a preview display on the touch panel display 1001 is not cancelled, and a print target continues to be displayed. Then, when a user presses the secure preview button 153 to execute a secure preview, only cancellation of projection by the projector 20 is required. In this way, image control of the touch panel display 1001 is simplified.

(5) According to at least one embodiment, when a user wishes to ensure security by pressing the secure preview button 153, preview display by the projector 20 is cancelled, but the present disclosure is not limited to this. According to at least one embodiment, when the secure preview button 153 is pressed, the projection optical system 23 in the projector 20 is controlled to reduce a projected image on a projection screen to, for example, ½ or ⅓ of paper size, such a third party not be able to see it clearly. Further, a user may be able to specify a reduction ratio in advance. On the other hand, when the real preview button 154 is pressed, the projection optical system 23 in the projector 20 is controlled to enlarge the projected image on the projection screen to the paper size.

(6) According to at least one embodiment, image data that is read by the sheet-through method or the document scanning method to be printed on paper is a target for secure preview and real preview, but the present disclosure is not limited to this. According to at least one embodiment, the image forming device 1000 is provided with a card reader to which a universal serial bus (USB) or secure digital (SD) card can be connected, the card reader reads from the USB card or SD card, and image data to be used for a print function may be a target of a secure preview or real preview.

(7) According to at least one embodiment, projection onto the reflector 1009 is executed by using the projector 20 provided to the image forming device 1000, but the present disclosure is not limited to this. According to at least one embodiment, a projector device connected via a high-definition multimedia interface (HDMI—registered trademark) cable, a USB cable, or a local area network (LAN) is used to project a print target onto a wall surface or the like.

(8) The projection portion 18 accommodating the projector 20 is provided on the front wall of the exterior body 1041 of the scanner 1004, but the present disclosure is not limited to this. The projection portion 18 may be inside the exterior body 1041 of the scanner 1004, at a location that does not interfere with the scan unit 10. Further, a hole with a bottom may be provided in a bottom wall of the exterior body 1041, and the projector 20 disposed therein.

(9) According to at least one embodiment, a preview display is executed with respect to print setting results, but the present disclosure is not limited to this. According to at least one embodiment, the image processing engine 205 accepts settings for image quality adjustment functions such as density adjustment, background adjustment, contrast adjustment, brightness adjustment, character reproduction adjustment, and sharpness adjustment, and the image processing engine 205 executes a preview display via the projector 20 according to the settings for image quality. Specifically, filter processing, gamma correction, and halftone processing are executed according to the settings for image quality. In filter processing, filter coefficients according to the settings for image quality adjustment are used to execute filter processing consisting of product-sum calculations, thereby sharpening and/or smoothing output image data.

In gamma correction, the image processing engine 205 corrects density by using a one-dimensional lookup table (LUT) according to the settings for image quality adjustment.

In halftone processing, the image processing engine 205 uses a dither matrix according to the settings for image quality adjustment to convert CMYK color pixels into image data having pseudo halftone expressions. A preview display presents the results of such filtering, gamma correction, and halftone processing to a user, and if the used performs a positive operation with respect to such results, printing is executed based on the results of the filtering, gamma correction, and halftone processing.

(10) According to at least one embodiment, a preview display is executed with respect to print setting results, but the present disclosure is not limited to this. According to at least one embodiment, a preview display of the results of executing functions such as watermark synthesis, date/time synthesis, page number synthesis, and stamp synthesis is projected by the projector 20.

(11) According to at least one embodiment, the potentiometer provided to the hinge 52 detects the swing angle of the automatic document feeder 1006, but the present disclosure is not limited to this. According to at least one embodiment, a variable resistor is provided to a hinge shaft of the hinges 51, 52, and a swing angle formed by the document holding cover 1005 is detected by a voltage drop caused by the variable resistor.

(12) According to at least one embodiment, a preview display is executed at paper size by projection onto the reflector 1009, but the present disclosure is not limited to this. Size of a projection screen of the projector 20 may of course exceed screen size of the touch panel display 1001. According to at least one embodiment, size of the projection screen of the projector 20 may be larger than size of the paper selected in the print settings. At this time, it is preferable to receive an indication of the size of the projection screen from a user and execute projection at the size of the projection screen indicated.

(13) According to at least one embodiment, the image forming device 1000 is a multifunction peripheral, but the present disclosure is not limited to this. According to at least one embodiment, the image forming device 1000 is a production printing device, or a single-function copier. Further, the image forming device 1000 is not limited to an electrophotographic method, and may use an inkjet method. Further, the image forming device 1000 is not limited to using all of the Y, M, C, K colors, and may use only K, for example. Further, the image forming device 1000 may be a color image forming device provided with exposure units and developing units for K and any one of Y, M, C.

Although one or more embodiments of the present invention have been described and illustrated in detail, the disclosed embodiments are made for the purposes of illustration and example only and not limitation. The scope of the present invention should be interpreted by the terms of the appended claims.

What is claimed is:

1. An image forming device that executes a preview display of an image to be printed, the image forming device comprising:
    a projector;
    a panel display;
    a receiver that receives an instruction indicating whether or not to implement security in the preview display; and
    a controller that, when an instruction to implement security is not received, controls the projector to execute the preview display according to a first mode that represents the image to be printed at a display area equal to or larger than a defined size, and when an instruction to implement security is received, controls the projector and the panel display to execute the preview display according to a second mode that represents the image to be printed at a display area less than the defined size.

2. The image forming device of claim 1, further comprising:
    an image reader that reads media and outputs image data indicating read content, wherein
    the image to be printed is obtained by converting image data output by the image reader into a print format according to print settings set by a user, and
    the defined size is size of a sheet selected in the print settings by a user.

3. The image forming device of claim 1, further comprising:
    a memory that stores image data converted into a print format, wherein
    the projection unit and the panel display unit share the image data in the print format stored in the memory at a time of the preview display.

4. The image forming device of claim 2, wherein
    the image data converted to the print format consists of multiple pages of image data, and
    when a user instructs that pages be switched, the controller causes execution of the preview display according to the first mode or the second mode with respect to a previous page or a next page of the multiple pages of image data.

5. The image forming device of claim 2, further comprising:
    an automatic document feeder (ADF) and a document holding cover integrated with the ADF that can be switched between a closed position and an open position, wherein
    the media is a plurality of documents, the image reader is a scanner, the ADF is disposed on the scanner, and the ADF feeds each of the documents to a position where the scanner reads the documents when the document holding cover is in the closed position, and
    the projector projects the image to be printed onto a document holding surface of the document holding cover in the open position.

6. The image forming device of claim 5, wherein
    after starting projection onto the document holding surface of the document holding cover, when the document holding cover is switched from the open position to the closed position, the controller changes the preview display from the first mode to the second mode.

7. The image forming device of claim 2, further comprising:
    platen glass; and
    a document holding cover, wherein
    the media is a document, the image reader is a scanner, and the document to be read is placed on the platen glass,
    the document holding cover's position can be changed between a closed position covering the platen glass and an open position that does not cover the platen glass, and
    the projector projects the image to be printed onto a document holding surface of the document holding cover in the open position.

8. The image forming device of claim 7, wherein
    when the document holding cover is switched from the open position to the closed position, the controller changes the preview display from the first mode to the second mode.

9. The image forming device of claim 2, wherein
    the media is portable media and the image reader is a media reader that reads image data from the portable media.

10. The image forming device of claim 1, wherein
    the projector projects the image to be printed onto a wall surface in the vicinity of the image forming device.

11. The image forming device of claim 1, wherein
    the control by the controller according to the second mode cancels projection of the image to be printed by the projector and causes display of the image to be printed only on the panel display.

12. The image forming device of claim 1, wherein
    the control by the controller according to the first mode causes the projector to project the image to be printed and also causes the panel display to display the image to be printed, and
    the control by the controller according to the second mode cancels projection of the image to be printed by the projector and causes display of the image to be printed only on the panel display.

13. The image forming device of claim 1, wherein
    the control by the controller according to the second mode causes the projector to project the image to be printed at a reduced size smaller than the defined size.

* * * * *